(12) United States Patent
Conti

(10) Patent No.: US 10,555,642 B2
(45) Date of Patent: Feb. 11, 2020

(54) COFFEE GRINDING AND PROPORTIONING DEVICE, ESPECIALLY FOR ESPRESSO MACHINES

(71) Applicant: CGTECNICA S.R.L., Florence (FI) (IT)

(72) Inventor: Gianluca Conti, Sesto Fiorentino (IT)

(73) Assignee: CGTECNICA S.R.L., Florence (IT)

( * ) Notice: Subject to any disclaimer, the term of this patent is extended or adjusted under 35 U.S.C. 154(b) by 319 days.

(21) Appl. No.: 15/525,030

(22) PCT Filed: Nov. 2, 2015

(86) PCT No.: PCT/IB2015/058466
§ 371 (c)(1),
(2) Date: May 5, 2017

(87) PCT Pub. No.: WO2016/071826
PCT Pub. Date: May 12, 2016

(65) Prior Publication Data
US 2018/0279830 A1    Oct. 4, 2018

(30) Foreign Application Priority Data

Nov. 7, 2014 (IT) ................................ FI2014A0249

(51) Int. Cl.
*A47J 42/40* (2006.01)
*A47J 42/36* (2006.01)
*A47J 31/06* (2006.01)
*A47J 31/42* (2006.01)

(52) U.S. Cl.
CPC ............ *A47J 42/40* (2013.01); *A47J 31/0663* (2013.01); *A47J 31/42* (2013.01); *A47J 42/36* (2013.01)

(58) Field of Classification Search
CPC .............................. A47J 31/0663; A47J 31/42
See application file for complete search history.

(56) References Cited

U.S. PATENT DOCUMENTS

| 2,413,687 | A |   | 1/1947 | Bogoslowsky |
|---|---|---|---|---|
| 5,174,194 | A |   | 12/1992 | Piana |
| 5,386,944 | A |   | 2/1995 | Knepler et al. |
| 5,399,370 | A | * | 3/1995 | Hsu .......................... A23F 5/262 426/432 |
| 5,632,449 | A | * | 5/1997 | Sandolo .................... A47F 1/02 241/100 |
| 6,988,444 | B1 |   | 1/2006 | Pfeifer et al. |

(Continued)

OTHER PUBLICATIONS

International Preliminary Report on Patentability, PCT/IB2015/058466, EP/ISA, dated May 9, 2017.

*Primary Examiner* — Adam J Eiseman
*Assistant Examiner* — Mohammed S. Alawadi
(74) *Attorney, Agent, or Firm* — Nancy J. Flint, Attorney at Law, P.A.; Nancy J. Flint, Esq.

(57) ABSTRACT

A simple or multiple coffee grinder equipment, supplemented by a proportioner device, the latter equipped with means for measuring the weight of the ground product. The proportioner device controls the operation of the individual coffee grinders, and stops grinding upon reaching the desired weight of ground product for each individual quality. The proportioner device also includes a special mechanism to improve the mixing and homogenization of the ground product, as well as to prevent the formation of lumps.

13 Claims, 6 Drawing Sheets

(56) References Cited

U.S. PATENT DOCUMENTS

| | | | | |
|---|---|---|---|---|
| 2011/0014340 A1* | 1/2011 | Spitzley | ............... | A47J 31/20 |
| | | | | 426/433 |
| 2013/0087644 A1* | 4/2013 | Ephraim | ............... | B01F 7/001 |
| | | | | 241/33 |
| 2014/0203118 A1* | 7/2014 | Rego | ............... | A47J 42/44 |
| | | | | 241/6 |
| 2015/0135966 A1* | 5/2015 | Hulett | ............... | A47J 31/404 |
| | | | | 99/289 R |
| 2017/0339973 A1* | 11/2017 | Shi | ............... | A47J 31/42 |

* cited by examiner

COFFEE GRINDING AND PROPORTIONING DEVICE, ESPECIALLY FOR ESPRESSO MACHINES

TECHNICAL FIELD

The present invention refers to the field of equipment for grinding coffee beans or similar substances and for proportioning a precise and preset quantity of ground powder.

Specifically, the scope of the present patent is a simple or multiple, coffee grinder supplemented by a proportioning device provided with a loading cell, suitable for providing a desired quantity, in terms of weight, of a ground product, while warranting a perfect homogenization of the individual particles that make up the coffee and lamp break up.

STATUS OF THE ART

It is known that in preparing a quality coffee, an important role is played by the correct proportioning of quantity of coffee powder to be used to prepare the infusion.

Also, considering the special hygroscopic properties of coffee powder, very important are the degree of mixing and homogeneity of the ground coffee, as well as the fact that, before preparing an infusion, the ground powder is held waiting for a time as short as possible.

Also the compression degree of the coffee powder plays an important role, as a matter of fact in coffee preparation machines the granulometry of the powder affects the flow of pressurized hot water and if the latter is too speedy or is hindered by an excessive compression, then the taste of the drink is negatively affected.

As much important is to avoid the formation of lumps of coffee powder.

Coffee grinder devices are known for long time which, besides making it possible to modify the granulometry of the powder resulting from a grinding, also make it possible to adjust the desired quantity of the ground product.

After some solutions based on measuring the grinding time or on measuring the volume, solutions have been developed including, for instance, U.S. Pat. No. 4,789,106 A, which weighed the whole coffee before grinding it; however, they were found to be rather inaccurate.

In particular, U.S. Pat. No. 5,386,944 A describes a coffee grinder for filter coffee, not for espresso machines, which basically comprises:

a device for grinding coffee beans;
  distribution means which control the inlet of the coffee beans into the grinder;
  selection means enabling a user to select the desired weight of ground coffee;
  a vessel put below the coffee grinder and suitable for receiving the ground coffee;
  weighing means associated with said vessel, suitable for measuring the weight of the ground coffee collected in the vessel itself;
  a control circuit co-operating with the grinder device, with said distribution means, with said selection means, and with said weighing means.

U.S. Pat. No. 5,522,556 A describes an integrated device dedicated to the preparation of filter coffee, which basically comprises:

a weight sensor;
  a device for grinding coffee beans;
  distribution means which control the inlet of the coffee beans into the grinder;
  selection means which enable a user to select the desired weight of ground coffee;
  a vessel put below the coffee grinder and suitable for receiving the ground coffee.

The weight sensor co-operates with a control circuit, which acts onto the distribution means by regulating the flow of coffee beans into the grinder as the weight of the ground coffee approaches the desired weight, the latter having been previously set by the user through the selection means. Specifically, a coffee grinder is described provided with two whole coffee tanks, capable of providing one mix of powders coming from both tanks.

Other claims of the patent describe the specific characteristics of the weight sensor.

All solutions mentioned above measure the weight of the coffee while this enters the filter-holder cup and regulate the grinding machine accordingly, so as to stop the grinding as soon as the preset weight is reached. The declared accuracy of this equipment is in the order of ±3 grams, or ±0.1 ounces; this is an accuracy level that is by far insufficient indeed for proportioning the coffee powder to be used in espresso machines, wherein the necessary quantity is in the order of 6 grams.

WO 2012/138327 A1 describes a coffee grinding apparatus and its respective methods for precisely measuring the weight of the coffee powder to be used in preparing an espresso infusion.

This equipment comprises a coffee-bean grinding device and a filter-holder cup put directly below the channel through which the ground powder leaves the coffee grinder.

The filter-holder cup is coupled with a weight measuring device so that the net weight of the coffee ground and delivered into the filter-holder can be easily determined.

This equipment can be configured to automatically stop the coffee grinding mechanism as soon as the desired weight of ground coffee is deposited into the filter-holder. In this example too the accuracy of the final weight of the ground coffee is very low because the weight is regulated through the grinding device, whose operation is subjected to a number of variables, including, for instance, the dimensions and the remaining characteristics of the beans, for instance their oiliness degree.

However, when grinding a coffee destined to espresso machines, it is absolutely inadvisable to reduce the angular speed of the grindstones to reduce the flow of coffee powder upon approaching the preset weight, because in this way the grinding degree is modified, with very bad results onto the final infusion; on the other hand, a progressive slowing down of the grindstones is the only way to improve the weighing accuracy in the devices of known type.

Also, the systems which have a weighing device integrated in the filter-holder are subjected to weight variations because of, even unintentional, shocks onto the filter-holder's handle.

Mechanisms are also known which foster the flow of the coffee powder in the distribution duct; for instance, patent application U.S. Pat. No. 5,174,194 A describes the use of an Archimedean screw driven by the shaft of the electric motor of the grindstones. Specifically, the Archimedean screw is associated with the motor with such a velocity ratio as to move the coffee powder more rapidly in the distributor compartment than at the output from the grindstones, thus avoiding the formation of deposits in the distribution duct and assuring that the complete grind quantity is actually delivered. In the subject application the weight is controlled on the basis of the operating time of the grindstones whereas the distribution duct just assures a transfer.

OBJECTS AND SUMMARY OF THE INVENTION

An object of the device according to the present patent application is thus to provide a coffee grinder capable of proportioning in an extremely accurate way the quantity of coffee powder without the drawbacks that result from the progressive reduction in the angular speed of the grindstones hence without controlling the quantity of coffee to be transferred into the filter on the basis of the operating time of the grindstones.

These objects of the present invention and others are achieved by a coffee grinder device in which the just ground powder is collected in a proportioner assembly comprising an independent distributor compartment, functionally associated with weight measuring means and internally to which there are means for controlling the evacuation of the coffee powder in an extremely accurate way.

A further object of the invention according to the present patent application is to provide a device capable of assuring a high degree of homogenization of the coffee powder, while assuring an appropriate mixing before transferring it into the filter; this result is achieved thanks to the presence of a mixing device placed inside a container which the just ground coffee powder goes through.

According to a simple and economical solution the mixing device supports the transit of the powder through a distributor compartment which accommodates internally thereto an Archimedean screw driven into a controlled rotation by appropriate drive means of known types; however, it is worth pointing out that such Archimedean screw can be driven into rotation both according to such a direction as to push the coffee both in the through-passing direction and in the opposite direction.

In order to make the coffee powder homogeneous, whenever the distributor is closed, the Archimedean screw is made rotate in the opposite direction with respect to that which is used to push the powder out of the distributor compartment.

Another object of the present device is to make it possible both the dispensation of just ground powder, in the exact quantity necessary for one or several infusions, and to automatically produce a flow of coffee powder appropriate for a continual use.

Surprisingly is this further result achieved by using the same Archimedean screw that assures a perfect homogenization of the just ground coffee powder, by making it rotate in such a way as to push the coffee powder toward the output from the distributor compartment hence in the reverse direction with respect to the homogenization rotation.

Both the control of the means used to drive the homogenizer device and the control of the grinding assembly preferably take place thanks to an interfacing of the different motors of the coffee grinder to a programmable controller; the latter is capable of setting the production of coffee powder on the basis of the quantity necessary for one cup or on the basis of the needs for having a quantity of coffee powder intermediate between a minimum quantity and a maximum quantity permanently available, inside the distributor, or is capable of further processes which will be better described below.

A further object of the present invention consists of providing the ground coffee powder not only in the exact desired quantity and under perfect homogeneity conditions, but also with the right degree of aggregation, while preventing formation of undesired lumps; the latter result is achieved thanks to a surprising modular configuration of the proportioner device, which is originally configured in such a way as to be capable of receiving one or several ground powder output devices configured in such a way as to offer a slight resistance, thus making the coffee powder increase its own density under the pushing action exerted by the new powder that takes it over, pushed by the rotation of the Archimedean screw thus breaking up, at the same time, any aggregations of ground powder.

A powder breaking up device of a particularly simple type comprises a flexible blades diaphragm, capable of slowing down the flow of coffee powder until the latter goes out and makes the blades flex.

A more complex brake-up device comprises two superimposed discs, both coaxial to the Archimedean screw, each of which includes a plurality of such openings as to leave a net passage section to the coffee whenever the discs are arranged in such a way that said openings are lined up and also capable of closing the flow whenever the two discs are arranged in such a way that the blind parts of a disc close up the openings of the other.

Whereas the lower disc is usually fixed and held in position by a ring nut which closes the distributor compartment, the upper disc is free of rotating under the driving action exerted onto its upper surface by some small brushes integrally associated with the end of the Archimedean screw on the delivery side; whenever the Archimedean screw rotates to drive out the coffee, the driving action exerted by said brushes makes the upper diaphragm rotate up to lining up the openings, whereas the device is closed thanks to a short feedback of the Archimedean screw; said feedback can also continue to assure homogeneity to the powder.

The opening and closing of the double disc device can, if necessary, take place thanks to a dedicated mechanization, interfacing to the control system of the whole equipment.

The double diaphragm device can also be installed in combination with the blade-based device.

An alternative solution to get the right degree of compression for the coffee powder, to break-up, if necessary, lumps and to simultaneously foster an orderly coming out from the distributor includes the use of a conical conveyor whose surface consist of a net or in any case presents numerous small openings; the conical shape of the conveyor results in conveying coffee powder to the center of the filter underneath.

In a particularly practical solution the inner surface of the cone is swept out by a movable doctor which prevents said small openings from getting obstructed; according to a practical and economical solution said doctor is coaxial to the Archimedean screw which it is integrally coupled with, however in this configuration the Archimedean screw cannot counter-rotate to homogenize the powder in the distributor compartment.

The speed at which the coffee powder is dispensed and transferred from the distributor to the filter depends on the speed of rotation of the Archimedean screw and is programmable by the operator; the control system, interfacing to the weighing system, takes care of progressively slowing down the rotation of the Archimedean screw upon getting close to the programmed weight, in order to maximize accuracy.

The present invention, in a configuration comprising more than one coffee grinder devices, each of which transfers the ground powder to inside the distributor compartment (5), makes it possible to decide whether to select each individual coffee grinder, hence to select the desired quantity, or to make the different coffee grinders operate in a combined manner, one at a time, so as to make it possible to form a mix by programming the exact weight for every quality of product.

This configuration also makes it possible to program a mix that comprises two or more varieties of coffee, in perfectly programmable and reproducible percentages, by setting the quantities for each individual variety; it is also possible to properly change the percentages depending on whether one wishes to obtain a cappuccino, which requires a little bit sweeter coffee, or an espresso, which features a stronger taste.

The equipment according to the present invention makes it possible to achieve what described above by using one device, which means a big advantage in terms of space occupation and flexibility of use.

The percentage quantities for each individual variety of coffee used to form a mix are not proportioned with the absolute accuracy that will finally proportioned the mix; as a matter of fact, the coffee grinders only stop upon reaching the programmed weight, which is detected by the loading cell, but in this case a change in the relative weight is fully irrelevant and unnoticeable in the final result, which will always be determined by the action of the proportioner device.

In order to get the programmed mix, the control system of the equipment makes the individual coffee grinders operate one at the time, while always leaving which features the highest weight last in such a way as to minimize the small weighing errors of each individual coffee grinder, in this configuration the powder mix mixing and homogenization effect which is assured by the Archimedean screw's feedback is very important.

Another object of the present invention is to provide an equipment wherein weight control is not disturbed in the case that, during the operation, the operator unintentionally touches the handle of the filter-holder cup.

In order to reduce the loss of volatile flavors from the ground coffee, provisions are made in order for nitrogen or another inert gas to be injected into the distributor compartment.

The configuration of the machine according to the present patent application can also include a non vertical axis for the distributor compartment and for the Archimedean screw.

Figure 1:
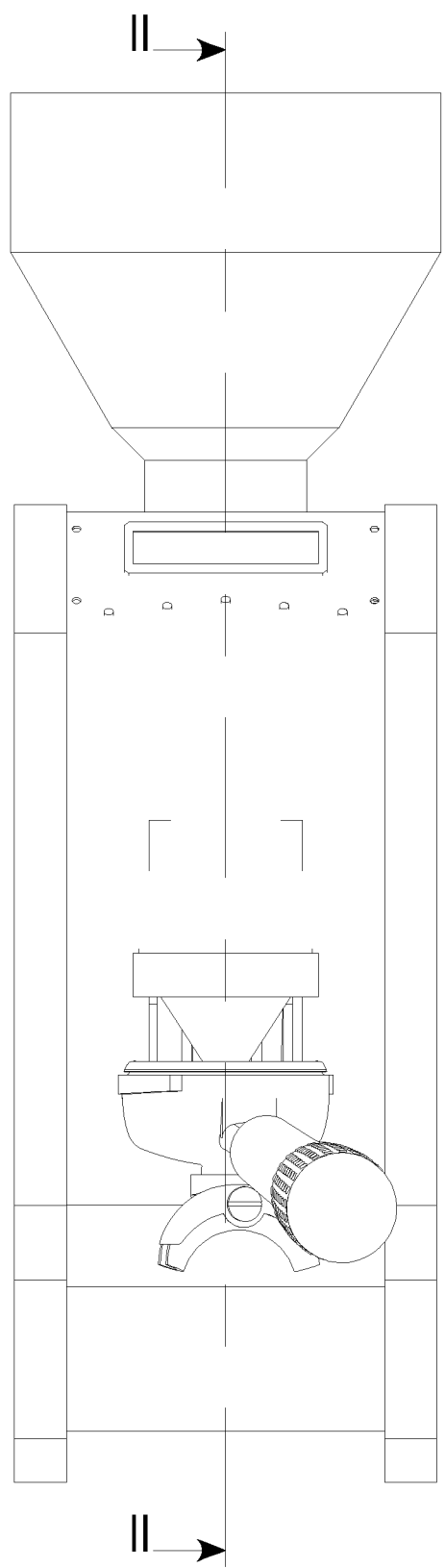
FIG. 1 shows a front view of an embodiment of the coffee grinding and proportioning device according to the present patent application wherein the trace of the cutting plane of FIG. 2 is shown.
Figure 2:
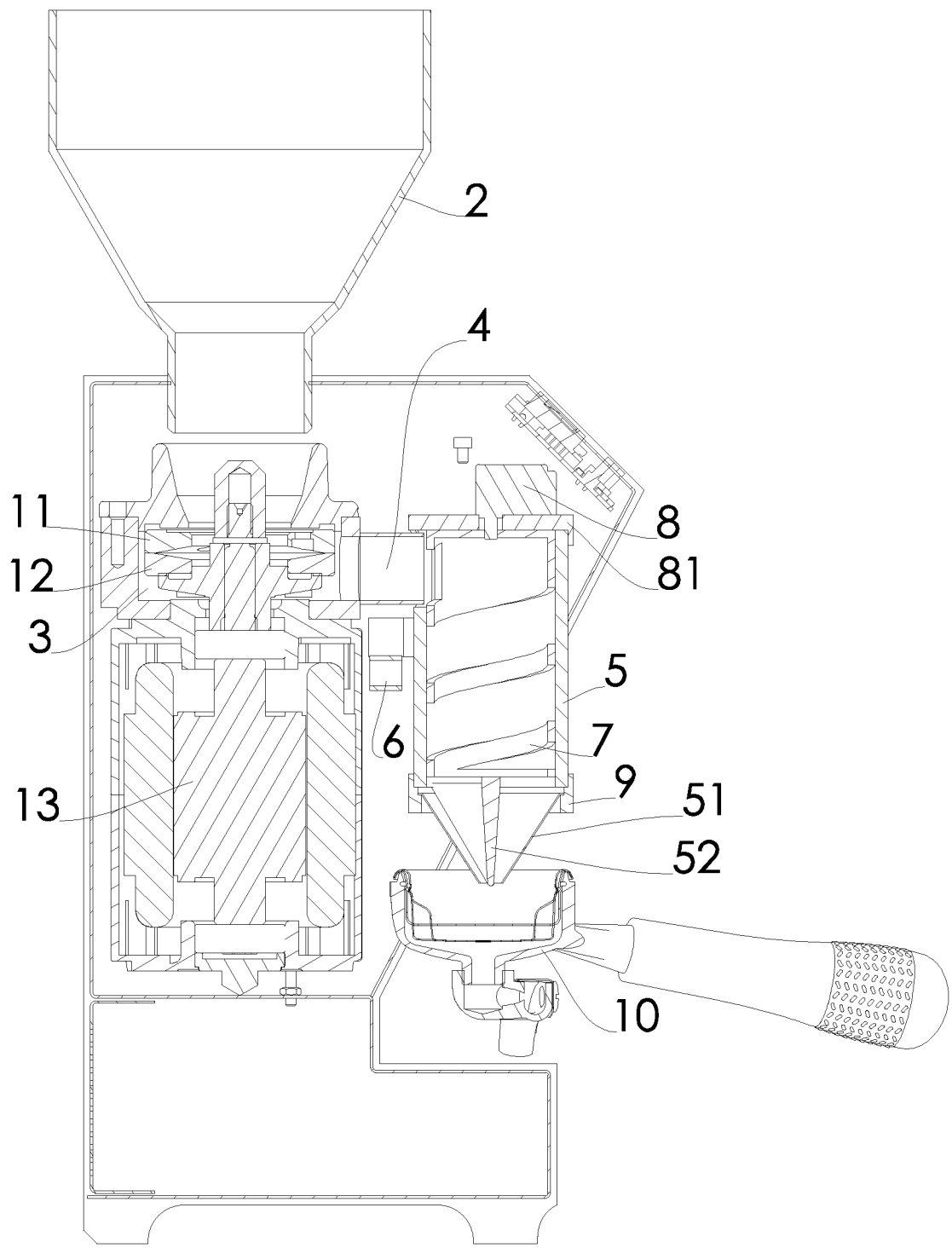
FIG. 2 shows a cross-section II-II. The distributor compartment (5) is closed on the upper part by a motor-holder head (81) which supports a motor (8) used to drive an Archimedean screw (7). In the lower part of the distributor compartment (5), which is held in position by a ring nut (9), a conical conveyor (51) is visible, whose inner surface is swept out by a doctor (52) coaxial to and integral with the Archimedean screw (7). A filter-holder cup (10) is shown below.

Below the output mouth (4) a loading cell (6) is visible. Lined up with a hopper (2) there are located, internally to a grinding compartment (3), an upper grindstone (11) and a lower grindstone (12) and, in the part underneath, a grinding motor (13).

Figure 3:
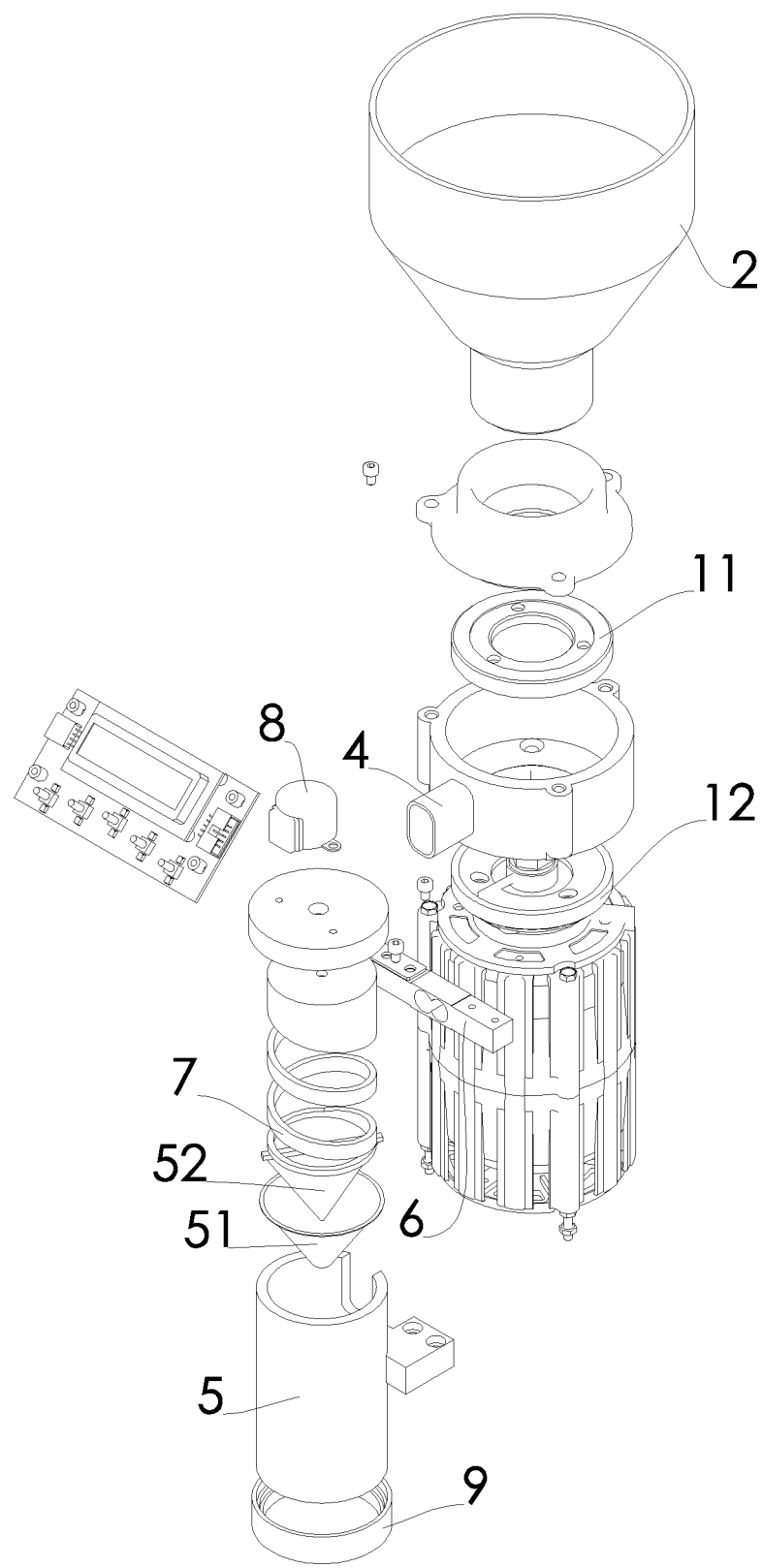

FIG. 3 shows an exploded view of the device according to the previous figures; on the upper part there is shown a hopper (2) which feeds the grinding assembly formed of the upper grindstone (11) and of the lower grindstone (12) with the beans to be ground.

The grinding assembly is accommodated inside the grinding compartment, provided with an output mouth (4) through which the ground powder goes into the distributor (5) which rests on the coffee grinder via the loading cell (6) only.

Internally to the distributor assembly (5) there is located the Archimedean screw (7), driven by the motor (8), which pushes the ground powder into the filter by making it pass through a conical conveyor (51) internally swept out by the doctor (52). The ring nut (9) is visible in lower side.

Figure 4:
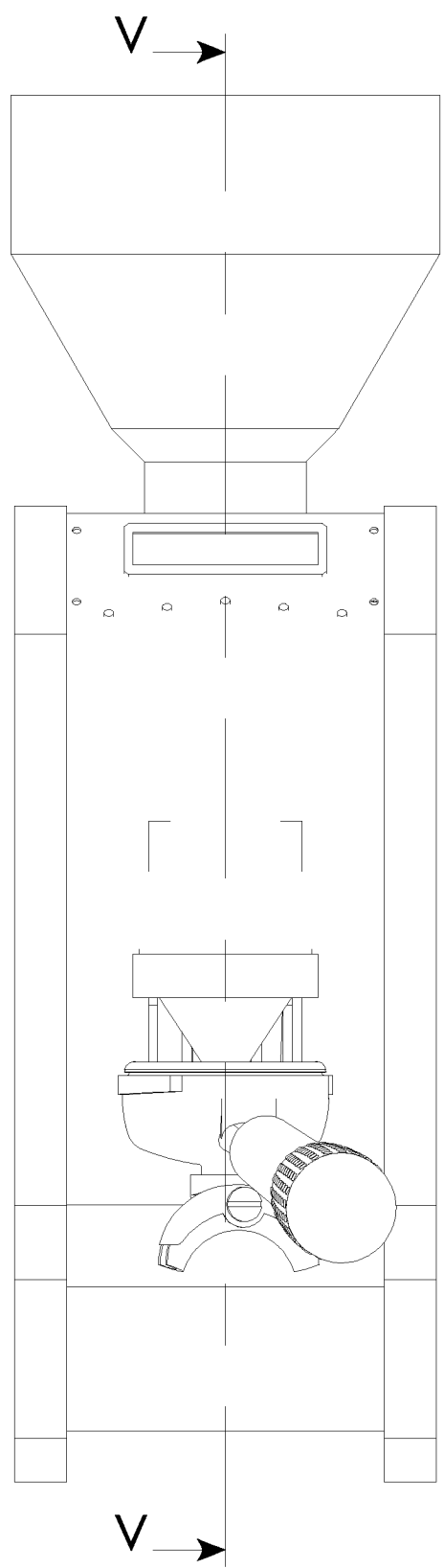
Figure 6:
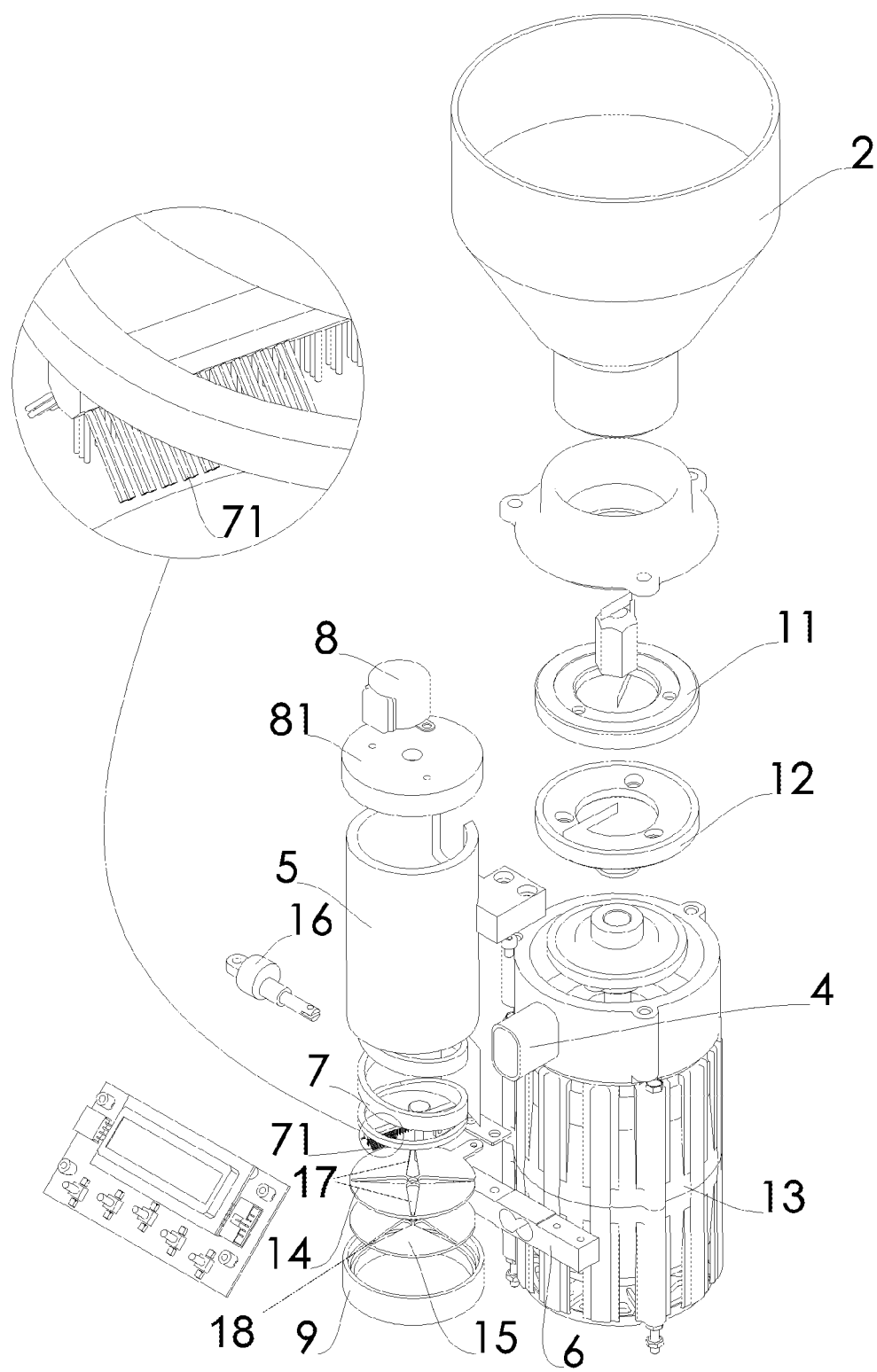

FIG. 4 shows a front view of an embodiment of the coffee grinding and proportioning device according to the present patent application which differs from that shown in the previous figures in the absence of the doctor (52) and in the presence of two discs (14, 15) and a number of brushes (71), as it can be seen in the cross-section of which the trace of the cutting plane is shown and in the exploded view of FIG. 6.

Figure 5:
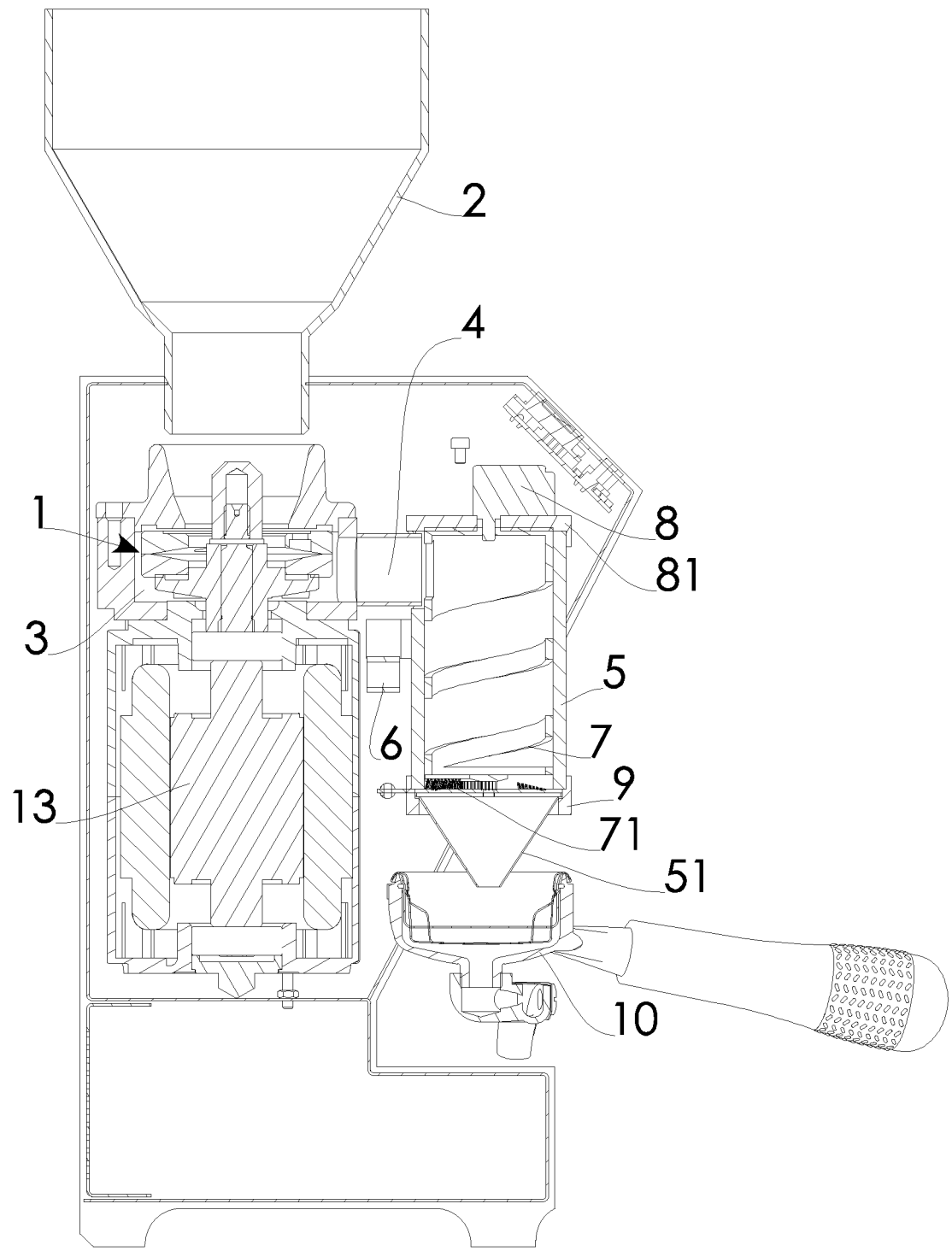

FIG. 5 shows a cross-section view V-V. On the right side one can see the distributor compartment (5), the loading cell (6), the motor (8) used to drive the Archimedean screw (7) supported by the motor-holder head (81), the ring nut (9), the conical conveyor (51), and the filter-holder cup (10). A number of brushes (71) are also visible. The distributor compartment (5) is connected via an output mouth (4) to the grinding compartment (3), underneath the hopper (2), internally to which there is a grinding assembly (1) driven by a grinding motor (13).

FIG. 6 shows an exploded view of the coffee grinder illustrated in the two previous figures with a detail of the brushes (71). On the bottom part of the distributor (5) there are two discs (14, 15). The lower disc (15) is fixed with respect to the ring nut (9) that holds the Archimedean screw (7) in position in the distributor compartment (5) and includes a plurality of lower disc openings (18). The upper disc (14) includes a plurality of upper disc openings (17). The upper disc (14) is idle and can rotate around a vertical axis, so that when the Archimedean screw rotates for dispensing purposes the upper disc (14) rotates because of the driving action slidingly exerted by some brushes (71) integral with the lower part of the Archimedean screw.

An appropriate setting device (16) limits the maximum rotation of the idle disc, so as to enable the operator to select the maximum opening desired. Removing said ring nut (9) makes it possible to extract and clean the complete equipment located inside the distributor.

Instead of taking advantage of the driving action exerted by the brushes, the rotation of the movable disc can also be controlled by an electromagnetic device or by an actuator, operated by the control system of the equipment in a programmable manner.

Upon reaching the programmed quantity the Archimedean screw inverts its rotation and, also thanks to the driving action exerted by the brushes, the movable disc counter-rotates in the opposite direction, up to closing; then, the Archimedean screw stops to prevent an undesired dispensation of coffee.

In order to homogenize the ground coffee, the Archimedean screw counter-rotates slowly even when the coffee grinder is in operation and also it is possible to program the activation at regular (timed) intervals whenever the loading cell detects the presence of coffee internally to the proportioner and in any case in correspondence with every switch on.

The figure does not show the conical conveyor (51) in order to highlight how the device is capable of operating even without such element.

The exploded view makes also it possible to identify the grinding motor (13), the loading cell (6), the output mouth (4), the upper grindstone (11), the lower grindstone (12), the Archimedean screw (2), and the head (81) that carries the motor (8).

DETAILED DESCRIPTION OF AN EMBODIMENT OF THE INVENTION

The following detailed description, which is made for merely explanatory not limitative purposes, with reference to the attached drawings, highlights the further features and the advantages deriving therefrom and which are integral parts of the subject invention.

In a particularly compact and economical embodiment, the grinder device according to the present patent application comprises: a grinding assembly (1) with a pair of grindstones (11, 12) co-operating with each other, substantially coaxial according to a vertical axis, located inside a grinding compartment (3), the latter communicating with a hopper (2) in which the beans to be ground are placed and with an output mouth (4) from which the ground product comes out and is transferred to a proportioner assembly which comprises a distributor container (5). The latter accommodates internally thereto an Archimedean screw (7) and is functionally associated with a loading cell (6) capable of exactly measuring any changes in weight.

The motor (13) used to drive the grinding assembly (1) is located below the grinding compartment (3).

The coffee powder comes out from the distributor (5) thanks to the action of the Archimedean screw (7) operated by a motor (8) and is thus transferred to a filter accommodated in a filter-holder cup.

According to a preferred embodiment the motor (8) that drives the Archimedean screw (7) is an electric motor driven by the control system of the machine in a programmable manner.

In a particularly very accurate embodiment solution, at the output from the distributor (5) there is a double disc device whose function is to spread the ground material homogeneously in the filter-holder.

Said device comprises two coaxially superimposed discs, each of which is provided with a set of openings which are superimposable to those of the other disc.

The lower disc (15) is integral with the ring nut (92) that holds the Archimedean screw blocked in the distributor (5), and removing such ring nut (92) makes it possible to extract and clean the elements inside the distributor (5); the upper disc (14) is idle and can freely rotate.

Preferably are the double disc device and the Archimedean screw (7) coaxial, so that, when the Archimedean screw (7) is rotating for dispensing purposes, the upper idle disc (14) rotates owing to the driving action slidingly exerted by some brushes (71) integral with the lower part of the Archimedean screw (7); a special setting device (16) limits the maximum rotation of the idle disc (14), so as to enable the operator to select the maximum opening desired.

In practice the rotation of the upper idle disc (14) is adjustable to its maximum value by means of a knob which varies the position of an abutment against which a projection present on the movable disc stops.

This projection engages a horizontal slot present in the disc housing in the lower part of the distributor.

The closing of the double disc device takes place owing to a very short feedback of the Archimedean screw (7) at the end of the ejection step, thus making the blind areas of the upper idle disc (14) close the openings of the lower fixed disc (15).

The device that regulates the position of the abutment that determines the maximum opening of the upper disc can also be driven via a servomechanism; according to a particularly accurate embodiment the relative rotation of the upper idle disc (14) with respect to the lower disc (15) can be induced by a servomechanism, for instance an electromagnetic device or an actuator, which also regulates its maximum opening; said servomechanism can advantageously interface to the control system of the coffee grinder.

The coffee grinder according to the present patent application can be used in a variety of manners thanks to a control system interfacing both to the loading cell (6) and to the motor of the Archimedean screw (8) and to the motor of the grinding assembly (13) in addition, if necessary, to the control system of the double disc device.

If one wishes to privilege freshness in grinding, the distributor assembly (5) will be held empty and the grinding assembly (1) will only be operated in the moment when powder is requested, in order to produce a quantity of powder slightly greater than that necessary for one infusion; the switch-off of the grinding assembly (1), controlled by the control system, will take place after the loading cell (6) reports that internally to the distributor (5) there is a quantity of coffee powder as necessary for the infusion; in practice, the inertia of the whole grinding system will warranty that in the distributor compartment (5) always there will be a quantity of ground coffee slightly greater than that set, but not so much in excess as to leave in the compartment a quantity of residual powder sufficient to negatively affect the freshness of the next charge.

The transfer of the exact quantity of coffee powder internally to the filter will take place thanks to the action exerted by the Archimedean screw (7) which pushes the powder into the filter, by making it go through a homogenizing and lump break up diaphragm comprising the lower disc (15) and the upper disc (14), the speed of the Archimedean screw (7) will be progressively reduced upon approaching the preset weight, but this reduction in speed will have no negative effect onto the already ground coffee powder.

Conversely, should the operator wish to foster a continuous operation of the coffee grinder, the grinding assembly (1) will automatically start in the moment when the quantity of coffee powder contained inside the distributor (5) falls below a preset value, to subsequently and automatically stop as soon as the loading cell (6) reports that the preset maximum charge is reached.

The invention claimed is:

1. A device for grinding coffee or another grainy material, comprising at least one motor-driven grinding assembly, fed by a hopper and an output mouth, and from the output mouth of which a powder comprising the ground grainy material enters a distributor compartment, wherein said distributor compartment is functionally associated with means that measures the weight of the powder inside the distributor compartment, wherein further said distributor compartment internally accommodates an Archimedean screw, wherein the Archimedean screw is driven by a motor that rotates according to a pushing direction to obtain a precision evacuation of the powder contained inside said distributor compartment, said powder being so delivered to inside a filter of a filter-holder cup, wherein further a plurality of brushes are integrally associated with the lower part of said Archimedean screw, wherein said Archimedean screw rotates in the direction opposite to the pushing direction of the motor to homogenize and mix the powder that had been delivered to inside said distributor compartment by said at least one motor-driven grinding assembly.

2. The device of claim 1, characterized in that said Archimedean screw drives the powder out from said distributor compartment through a homogenizer and lump break up diaphragm, wherein said brushes rub on the surface of the homogenizer and lump break up diaphragm.

3. The device of claim 2, characterized in that said homogenizer and lump break up diaphragm comprises a plurality of flexible blades.

4. The device of claim 3, characterized in that said means used to weigh the coffee powder contained inside said distributor compartment comprises a loading cell interfacing to a control system of the device.

5. The device of claim 4, characterized in that said motor used to drive said Archimedean screw is an electric motor operated by the control system of the device.

6. The device of claim 1, wherein said means used to weigh the coffee powder contained inside said distributor compartment comprises a loading cell interfacing to a control system of the device.

7. The device of claim 6, wherein said motor used to drive said Archimedean screw is an electric motor operated by the control system of the device.

8. The device of claim 1, further comprising a powder conical conveyor, placed downstream with respect to the distributor compartment and immediately before the filter, wherein said conical conveyor comprises a material permeable to the ground powder.

9. The device of claim 8, wherein the inner surface of said conical conveyor is swept out by a rotating doctor coaxial to and integrally associated with said Archimedean screw.

10. The device of claim 9, wherein said means used to weigh the powder contained inside said distributor compartment comprises a loading cell interfacing to a control system of the device.

11. The device of claim 1, wherein said motor used to drive said Archimedean screw is an electric motor operated by a control system of the device.

12. The device of claim 1, wherein the action exerted by said Archimedean screw in the pushing direction drives the powder out from said distributor compartment through a spreading device comprising a lower disc comprising a plurality of lower disc openings, fixed with respect to a ring nut that holds the Archimedean screw in position in the distributor compartment, said spreading device rotationally coupled with and coaxial to an upper disc comprising a plurality of upper disc openings, wherein said lower disc openings are superimposable with said upper disc openings, whereupon when the Archimedean screw rotates in the pushing direction to drive the ground powder out of said distributor compartment, the upper disc rotates owing to the driving action slidingly exerted thereon by said brushes such that at least some of the plurality of upper disc openings are at least partially superimposed with at least some of the plurality of lower disc openings, wherein the ground powder passes through the at least partially superimposed upper disc openings and lower disc openings and thus exit the lower end of said distributor compartment.

13. The device of claim 12, wherein said means used to weigh the coffee powder contained inside said distributor compartment comprise a loading cell interfacing to a control system of the device which operates the electric motor used to drive said Archimedean screw.

* * * * *